(12) United States Patent
Tanna

(10) Patent No.: US 11,921,564 B2
(45) Date of Patent: Mar. 5, 2024

(54) SAVING AND RESTORING CONFIGURATION AND STATUS INFORMATION WITH REDUCED LATENCY

(71) Applicant: Intel Corporation, Santa Clara, CA (US)

(72) Inventor: Deepak Rameshkumar Tanna, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/682,032

(22) Filed: Feb. 28, 2022

(65) Prior Publication Data

US 2023/0305619 A1   Sep. 28, 2023

(51) Int. Cl.
G06F 1/32 (2019.01)
G06F 1/3293 (2019.01)

(52) U.S. Cl.
CPC .................. G06F 1/3293 (2013.01)

(58) Field of Classification Search
CPC ...................................................... G06F 1/32
See application file for complete search history.

(56) References Cited

U.S. PATENT DOCUMENTS

| | | |
|---|---|---|
| 5,163,153 A | 11/1992 | Cole et al. |
| 5,522,087 A | 5/1996 | Hsiang |
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,898,689 B2 | 5/2005 | Storvik et al. |
| 6,971,033 B2 | 11/2005 | Ma |
| 6,996,728 B2 | 2/2006 | Singh |
| 7,010,708 B2 | 3/2006 | Magklis |
| 7,043,649 B2 | 5/2006 | Terrell |

(Continued)

FOREIGN PATENT DOCUMENTS

| | | |
|---|---|---|
| EP | 1282030 | 5/2003 |
| KR | 1020150079410 | 7/2015 |
| KR | 1020190008531 | 1/2019 |

OTHER PUBLICATIONS

Intel Corporation, "Intel 64 and IA-32 Architectures Software Developer's Manual," vol. 3B: System Programming Guide, Part 2, Apr. 2016, Chapter 14 Power and Thermal Management (14.1-14.9.5), 39 Pages.

(Continued)

*Primary Examiner* — Paul B Yanchus, III
(74) *Attorney, Agent, or Firm* — Trop, Pruner & Hu, P.C.

(57) ABSTRACT

In one embodiment, an apparatus includes: a port circuit to receive a configuration write from a source circuit; a save restore memory coupled to the port circuit to store information of a plurality of control and status registers (CSRs); and a configuration network coupled to the port circuit, the configuration network coupled to a plurality of nodes, each of the plurality of nodes comprising at least one CSR. The port circuit may be configured to send the configuration write to a first node of the plurality of nodes and to the save restore memory. Other embodiments are described and claimed.

20 Claims, 19 Drawing Sheets

(56) References Cited

U.S. PATENT DOCUMENTS

| | | |
|---|---|---|
| 7,051,227 B2 | 5/2006 | Kazachinsky et al. |
| 7,058,824 B2 | 6/2006 | Plante et al. |
| 7,093,147 B2 | 8/2006 | Farkas et al. |
| 7,111,179 B1 | 9/2006 | Girson et al. |
| 7,124,225 B2 | 10/2006 | Yao |
| 7,131,016 B2 | 10/2006 | Oh et al. |
| 7,146,514 B2 | 12/2006 | Kaushik et al. |
| 7,194,643 B2 | 3/2007 | Gonzalez et al. |
| 7,272,730 B1 | 9/2007 | Acquavia et al. |
| 7,272,732 B2 | 9/2007 | Farkas et al. |
| 7,412,615 B2 | 8/2008 | Yokota et al. |
| 7,426,648 B2 | 9/2008 | Lint et al. |
| 7,430,673 B2 | 9/2008 | Kardach et al. |
| 7,434,073 B2 | 10/2008 | Magklis et al. |
| 7,437,270 B2 | 10/2008 | Song et al. |
| 7,444,526 B2 | 10/2008 | Felter et al. |
| 7,451,333 B2 | 11/2008 | Naveh et al. |
| 7,454,632 B2 | 11/2008 | Kardach et al. |
| 7,529,956 B2 | 5/2009 | Stufflebeam |
| 7,539,885 B2 | 5/2009 | Ma |
| 7,562,334 B2 | 7/2009 | Magklis |
| 7,730,340 B2 | 6/2010 | Hu et al. |
| 7,739,537 B2 | 6/2010 | Albonesi et al. |
| 7,770,034 B2 | 8/2010 | Nanja |
| 7,930,564 B2 | 4/2011 | Arai et al. |
| 7,966,506 B2 | 6/2011 | Bodas et al. |
| 7,971,074 B2 | 6/2011 | Liu et al. |
| 8,024,590 B2 | 9/2011 | Song et al. |
| 8,041,967 B2 | 10/2011 | Belady et al. |
| 8,156,362 B2 | 4/2012 | Branover et al. |
| 8,181,047 B2 | 5/2012 | Lee |
| 8,301,868 B2 | 10/2012 | Newburn et al. |
| 8,442,697 B2 | 5/2013 | Schmitz et al. |
| 8,510,581 B2 | 8/2013 | Carvalho et al. |
| 8,650,424 B2 | 2/2014 | Rotem et al. |
| 8,700,943 B2 | 4/2014 | Dixon et al. |
| 8,769,316 B2 | 7/2014 | Anathakrishnan et al. |
| 8,832,478 B2 | 9/2014 | Anathakrishnan et al. |
| 8,943,334 B2 | 1/2015 | Kumar et al. |
| 8,943,340 B2 | 1/2015 | Anathakrishnan et al. |
| 8,949,637 B2 | 2/2015 | Knight |
| 8,954,770 B2 | 2/2015 | Anathakrishnan et al. |
| 8,954,977 B2 | 2/2015 | Song |
| 8,984,313 B2 | 3/2015 | Bhandaru et al. |
| 9,001,801 B2 | 4/2015 | Hillyard et al. |
| 9,026,815 B2 | 5/2015 | Anathakrishnan et al. |
| 9,074,947 B2 | 7/2015 | Anathakrishnan et al. |
| 9,104,409 B2 | 8/2015 | Dodeja et al. |
| 9,158,693 B2 | 10/2015 | Anathakrishnan et al. |
| 9,274,574 B2 | 3/2016 | Conroy et al. |
| 9,323,316 B2 | 4/2016 | Bhandaru et al. |
| 9,348,380 B2 | 5/2016 | Ping et al. |
| 9,354,689 B2 | 5/2016 | Bhandaru et al. |
| 9,436,245 B2 | 9/2016 | Bhandaru et al. |
| 9,552,034 B2 | 1/2017 | Yeager |
| 9,703,351 B2 | 7/2017 | Calson et al. |
| 10,234,930 B2 | 3/2019 | Lee et al. |
| 10,554,039 B2 | 2/2020 | Asam |
| 10,613,611 B2 | 4/2020 | Gendler et al. |
| 10,620,969 B2 | 4/2020 | Shanbhogue et al. |
| 10,739,844 B2 | 8/2020 | Nge et al. |
| 10,747,286 B2 | 8/2020 | Kaburlasos et al. |
| 11,099,628 B2 | 8/2021 | Ananthakrishnan et al. |
| 2002/0087816 A1* | 7/2002 | Atkinson ............... G06F 12/08 711/158 |
| 2003/0061383 A1 | 3/2003 | Zilka |
| 2006/0059286 A1 | 3/2006 | Bertone et al. |
| 2007/0079294 A1 | 4/2007 | Knight et al. |
| 2007/0106827 A1 | 5/2007 | Boatright et al. |
| 2007/0156992 A1 | 7/2007 | Jahagirdar |
| 2007/0245163 A1 | 10/2007 | Lu et al. |
| 2008/0250260 A1 | 10/2008 | Tomita |
| 2009/0150696 A1 | 6/2009 | Song et al. |
| 2016/0070327 A1 | 3/2016 | Nemani et al. |
| 2018/0356868 A1 | 12/2018 | Federico et al. |
| 2019/0041971 A1 | 2/2019 | Ananthankrishnan et al. |
| 2019/0302875 A1* | 10/2019 | Nguyen ............... G06F 1/3206 |
| 2020/0363860 A1 | 11/2020 | Ananthankrishnan et al. |

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

Intel Technology Journal, "Power and Thermal Management in the Intel Core Duo Processor," May 15, 2006, pp. 109-122.

International Application No. PCT/US18/30517, filed May 1, 2018, entitled "Power Control Arbitration," by Intel Corporation.

International Searching Authority, "Notification of Transmittal of the International Search Report and the Written Opinion of the International Searching Authority," dated Jul. 9, 2020, in International Application No. PCT/US2020/023580.

U.S. Appl. No. 16/230,440, filed Dec. 21, 2018, entitled "Apparatus and Method for Proactive Power Management," by Chee Lim Nge.

U.S. Appl. No. 16/412,606, filed May 15, 2019, entitled "System, Apparatus and Method for Dynamically Controlling Current Consumption of Processing Circuits of a Processor," by Nir Rosenzweig, et al.

* cited by examiner

SAVING AND RESTORING CONFIGURATION AND STATUS INFORMATION WITH REDUCED LATENCY

BACKGROUND

In modern processors, low power mode entry/exit using power gate/power rail collapse causes thousands (even up to 10,000 or more) of configuration and status registers (CSRs, also known as control and status registers) states to be saved and restored. This save/restore operation uses a configuration network as high a bandwidth as possible to reduce entry/exit latencies. Low power mode entry and wake up latency increases as the number of registers to be saved/restored increases. Save/restore latency directly impacts the number of opportunities for low power mode entry. The register count to be saved/restored grows with bigger system on chips (SoCs) and leads to a higher entry/wake up latency, undesirably impacting performance/user experience and limiting opportunities for power savings.

DETAILED DESCRIPTION

Figure 1:
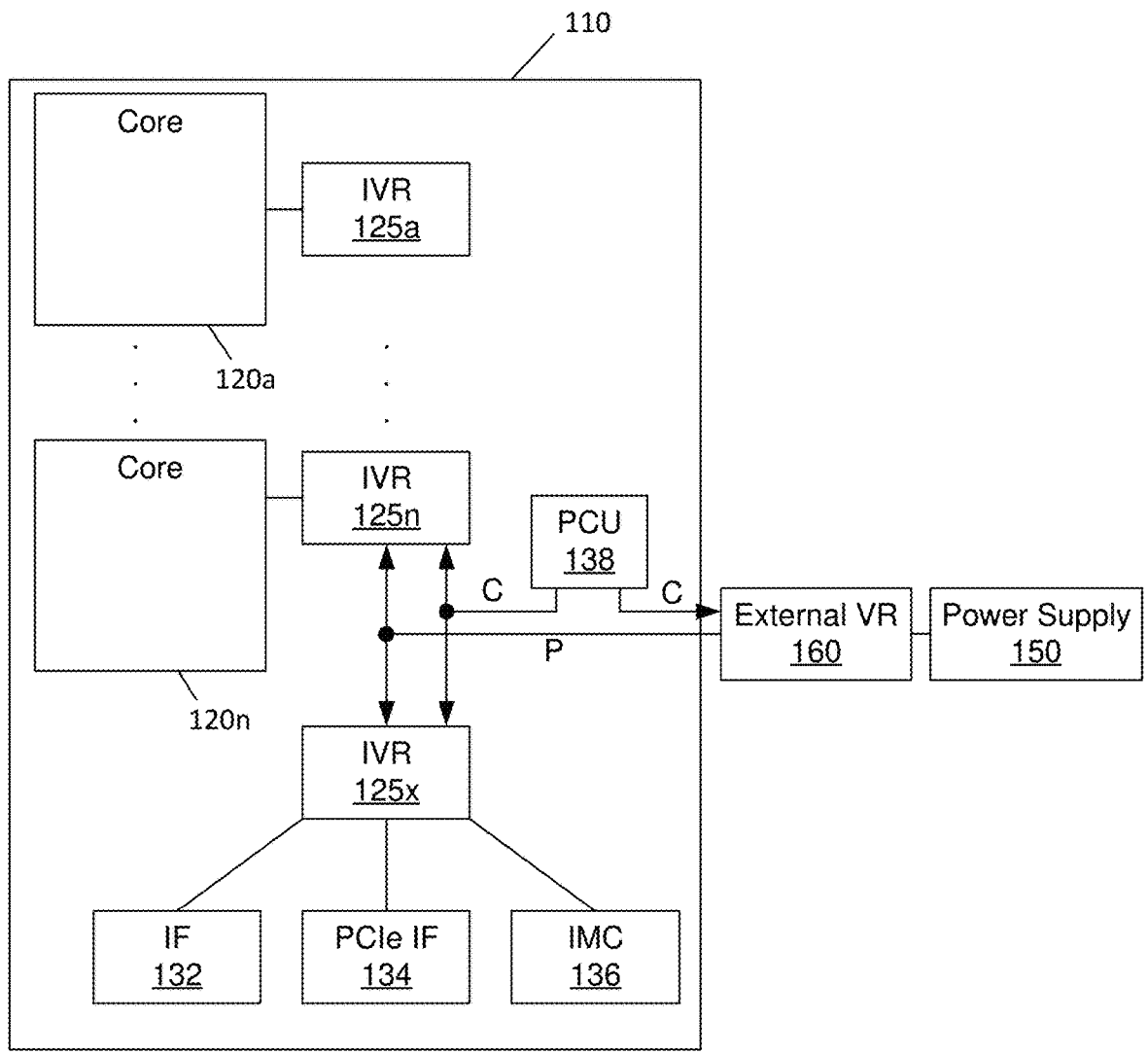
FIG. 1 is a block diagram of a portion of a system in accordance with an embodiment of the present invention.

In various embodiments, a processor, an intellectual property (IP) circuit or other system on chip (SoC) may be configured to dynamically update a save restore memory such as a save restore random access memory (SR RAM), without waiting for a low power state entry to trigger update to the SR RAM. More specifically, during normal operation updates to configuration information and status information of configuration and status registers (CSRs) may be written to the SR RAM in parallel with updates to the CSRs themselves. In this way, embodiments may provide for faster entry into low power states for corresponding circuitry including such CSRs and faster exit as well.

Stated another way, CSR state is saved in SR RAM as and when any CSR write access is detected. On this state save, an updated entry also is updated with a valid bit set to indicate that the corresponding CSR was updated at least once after cold boot/system power up. After exit from a low power mode, the SR RAM is read and only the CSRs which were modified (indicated by valid bit set) from the default reset value are restored.

Status CSRs are pushed from respective locations to the SR RAM as and when status is updated in the CSRs themselves. In this way, SR RAM is always up to date with status register values before low power entry. For a status CSR restore, a network on chip (NoC)/IP element has a copy of the status CSR if the logic is to consume the status bits. For a case where status bits are consumed inside the logic, the CSR can be marked with a valid bit when its contents updated. The CSR status change is pushed to SR RAM. The CSR content is then copied from the SR RAM back to NoC/IP element post-power up from low power mode like any other restorable control CSR if the valid bit is set. For these type of status CSRs, software read accesses are sent to the respective NoC/IP element. Error logging/interrupt status may be pushed as messages and corresponding CSR addresses in the SR RAM can be updated before the NoC/IP element sends an interrupt message. In this case, the interrupt message is seen by an interrupt aggregator only after the SR RAM is updated.

For a case where status content does not need to be copied back to the NoC/IP element because the content is not consumed inside the NoC/IP element, the NoC/IP element pushes status CSR information to the SR RAM every time status changes. But this status CSR content does not need to be copied back to the respective NoC/IP element post power up from low power mode. For this type of status CSR, software read access to the CSRs can be from the SR RAM, instead of sending a CSR read transaction on a configuration network, eliminating the need to wake up the configuration network from a clock gated state just for the CSR read.

In some cases, there may be some CSRs like performance monitoring (PMON) counters that are updated, e.g., every cycle, and some products may preserve contents of these during low power mode. Such CSRs may be saved/restored to SR RAM only at low power state entry/exit, in contrast to the dynamic (as and when) updates for configuration and other status CSRs described herein. In embodiments, these PMON-based registers may be the only CSRs that are saved to SR RAM after a low power entry CSR save trigger occurs, as would conventionally occur with all CSRs without an embodiment.

Thus with embodiments, there is close to zero CSR save time, and faster CSR restore time. The close to zero CSR save time is made possible with CSR state copied to SR RAM at the time of CSR write. The faster restore time is possible since only modified CSRs are restored.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a green technology future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enabled for operation for an Intel® Ultra Path Interconnect (UPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated. In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

Furthermore, while FIG. 1 shows an implementation in which PCU 138 is a separate processing engine (which may be implemented as a microcontroller), understand that in some cases in addition to or instead of a dedicated power controller, each core may include or be associated with a power control agent to more autonomously control power consumption independently. In some cases a hierarchical power management architecture may be provided, with PCU 138 in communication with corresponding power management agents associated with each of cores 120.

One power management logic included in PCU 138 may be power management circuitry to cause a given core, IP logic, or NoC element to be selectively powered down or placed into another low power state. With embodiments faster save and restore of CSR state from CSRs of these elements may be realized using port circuitry to interface with a save restore memory as described herein.

While not shown for ease of illustration, understand that additional components may be present within processor 110 such as additional control circuitry, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
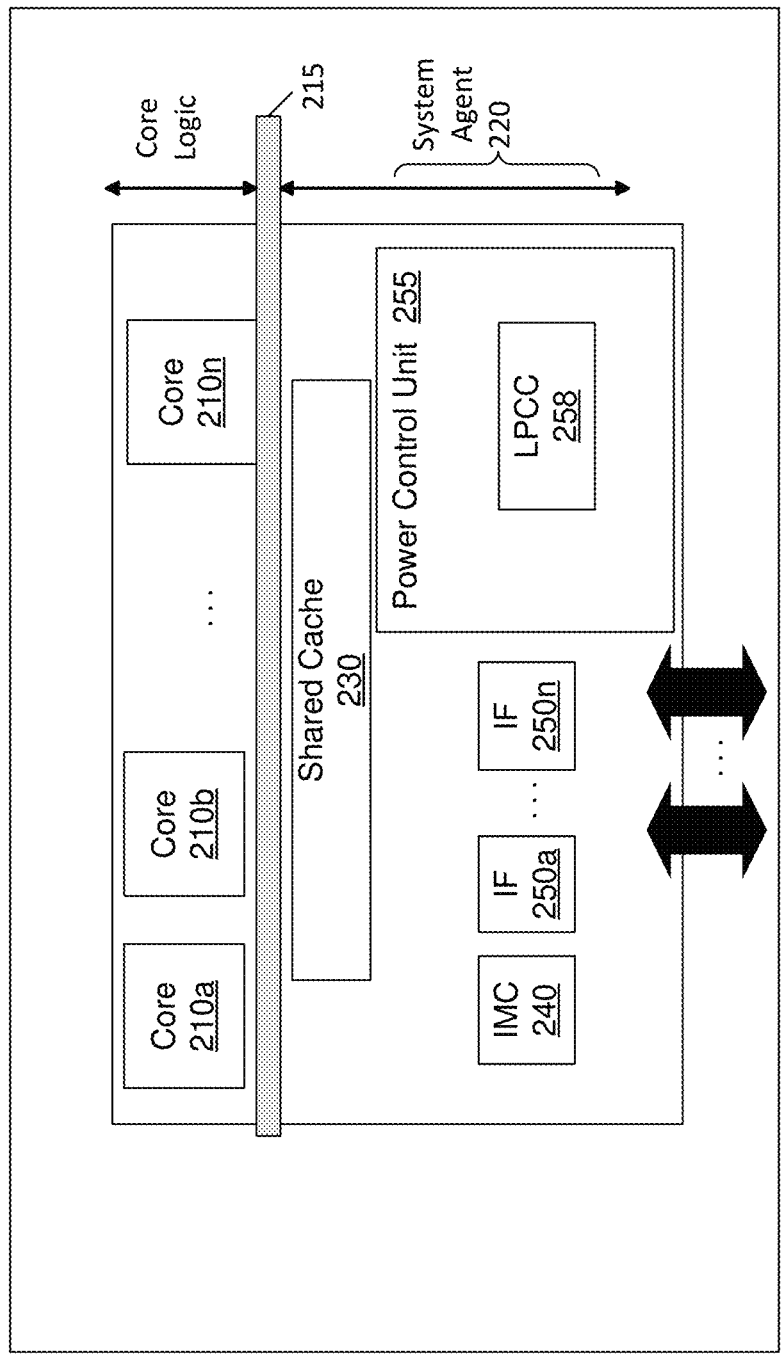
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via an interconnect 215 to a system agent 220 that includes various components. As seen, system agent 220 may include a shared cache 230 which may be a last level cache. In addition, the system agent may include an integrated memory controller 240 to communicate with a system memory (not shown in FIG. 2), e.g., via a memory bus. System agent 220 also includes various interfaces 250 and a power control unit 255, which may include logic to perform the power management techniques described herein. In the embodiment shown, power control unit 255 includes a low power control circuit 258 which may trigger low power state entries and exits. In turn, port circuitry that interfaces with a save restore memory as described herein may enable faster low power state entry and exit, by causing updates to corresponding CSRs to be saved into the save restore memory concurrently with the updates to the CSRs themselves.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
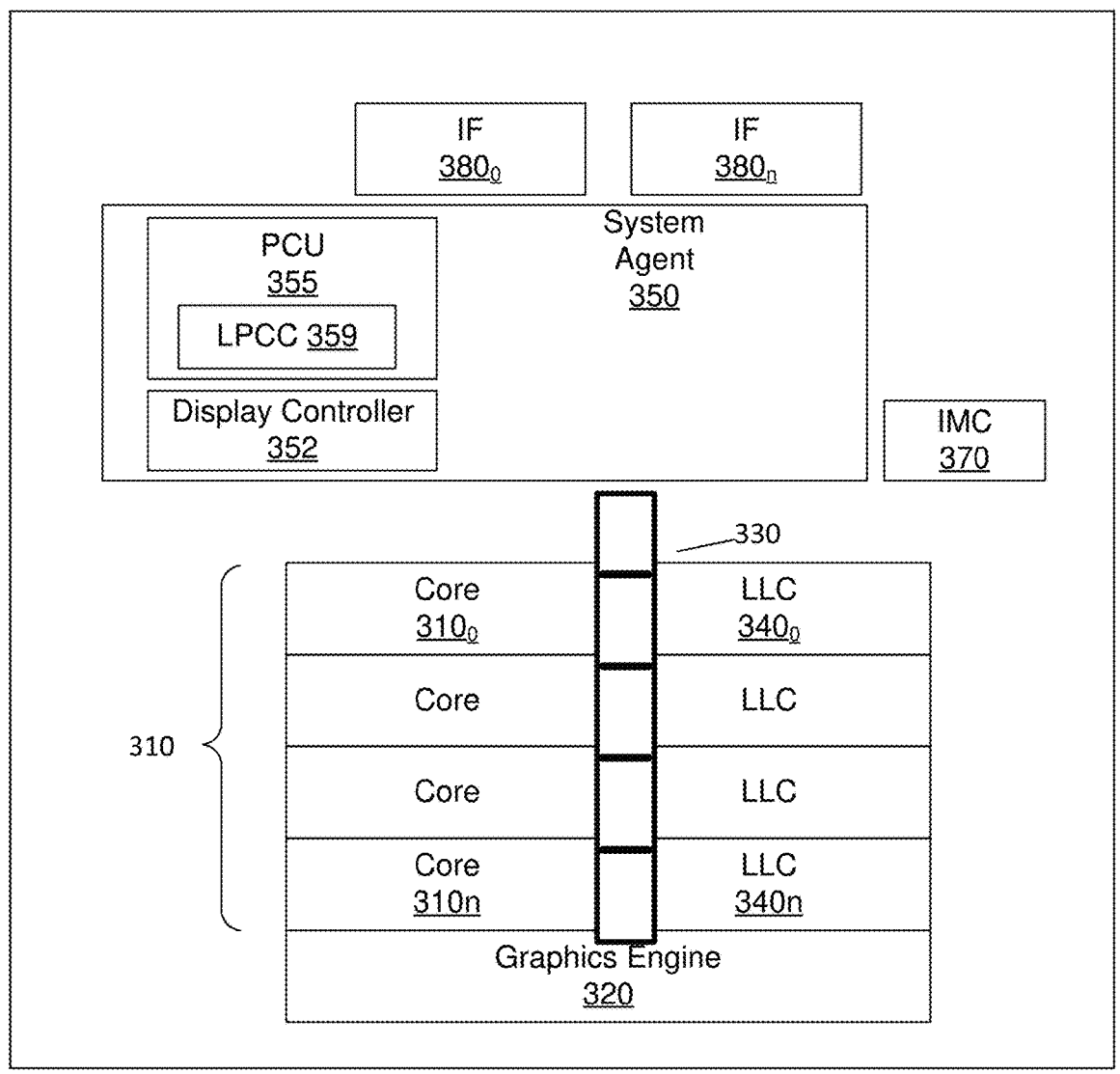
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein. In the embodiment shown, power control unit 355 includes a low power control circuit 359 which may trigger low power state entries and exits. In turn, port circuitry that interfaces with a save restore memory as described herein may enable faster low power state entry and exit, by causing updates to corresponding CSRs to be saved into the save restore memory concurrently with the updates to the CSRs themselves.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
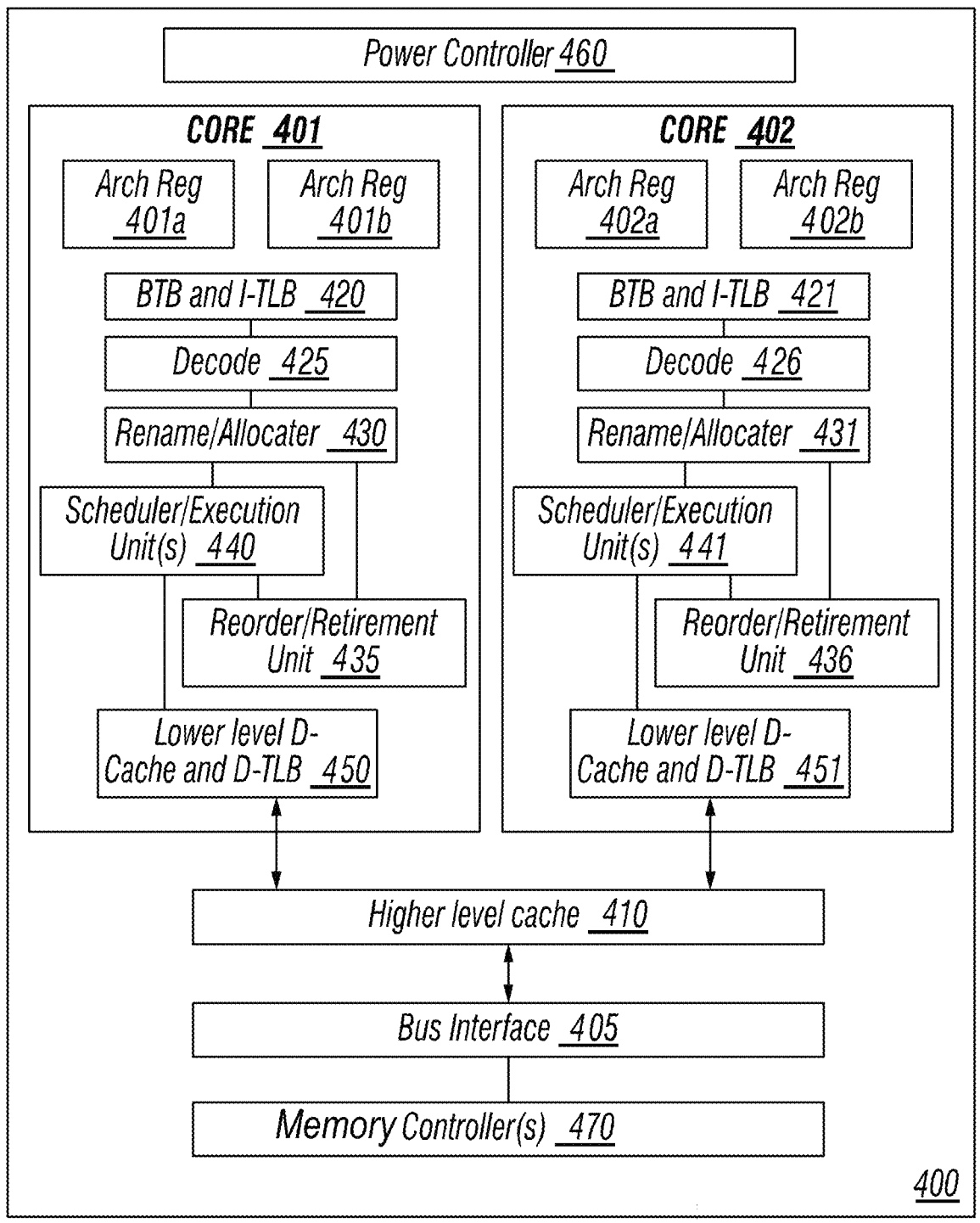
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
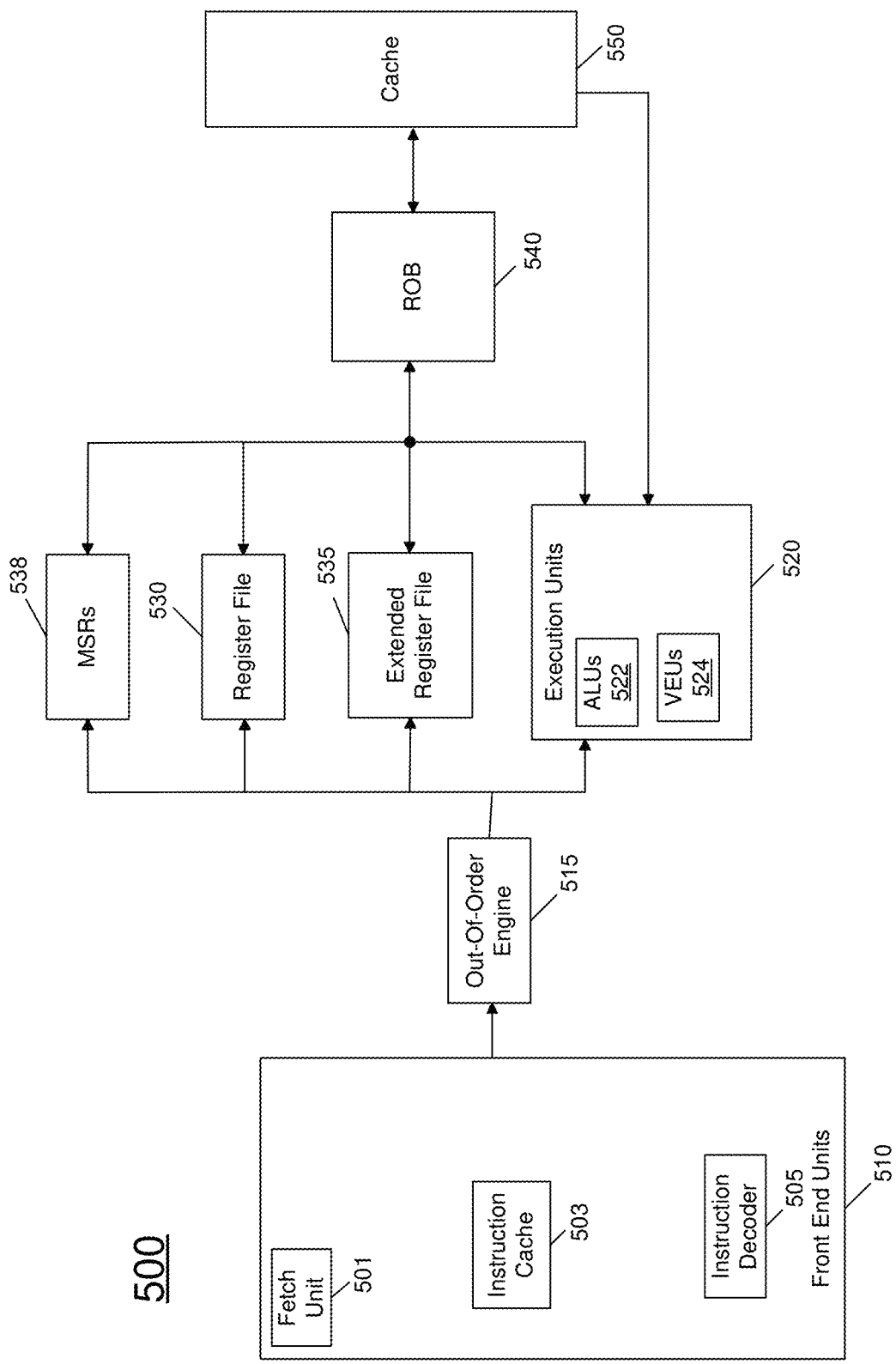
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register. For purposes of configuration, control, and additional operations, a set of machine specific registers (MSRs) 538 may also be present and accessible to various logic within core 500 (and external to the core).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
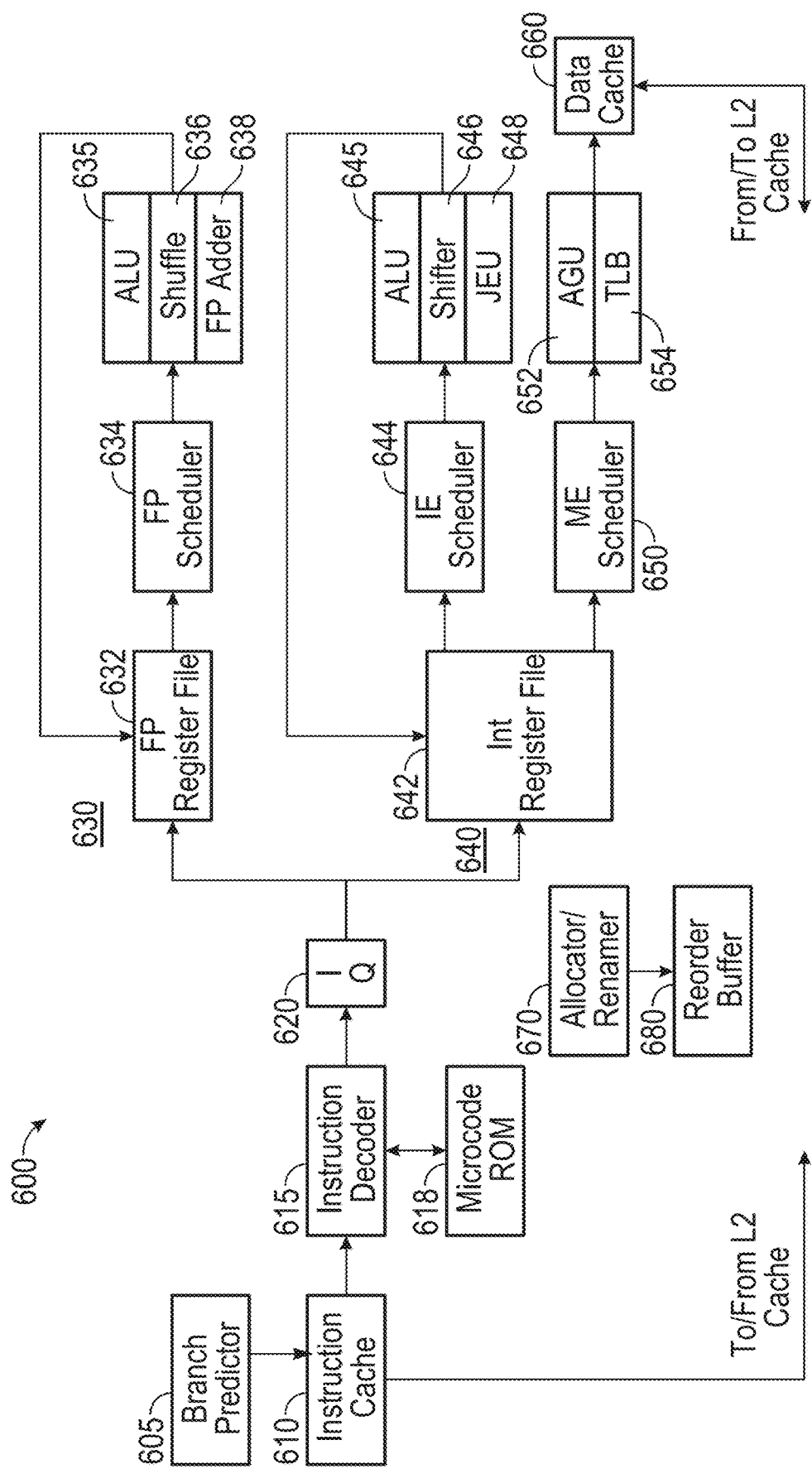
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
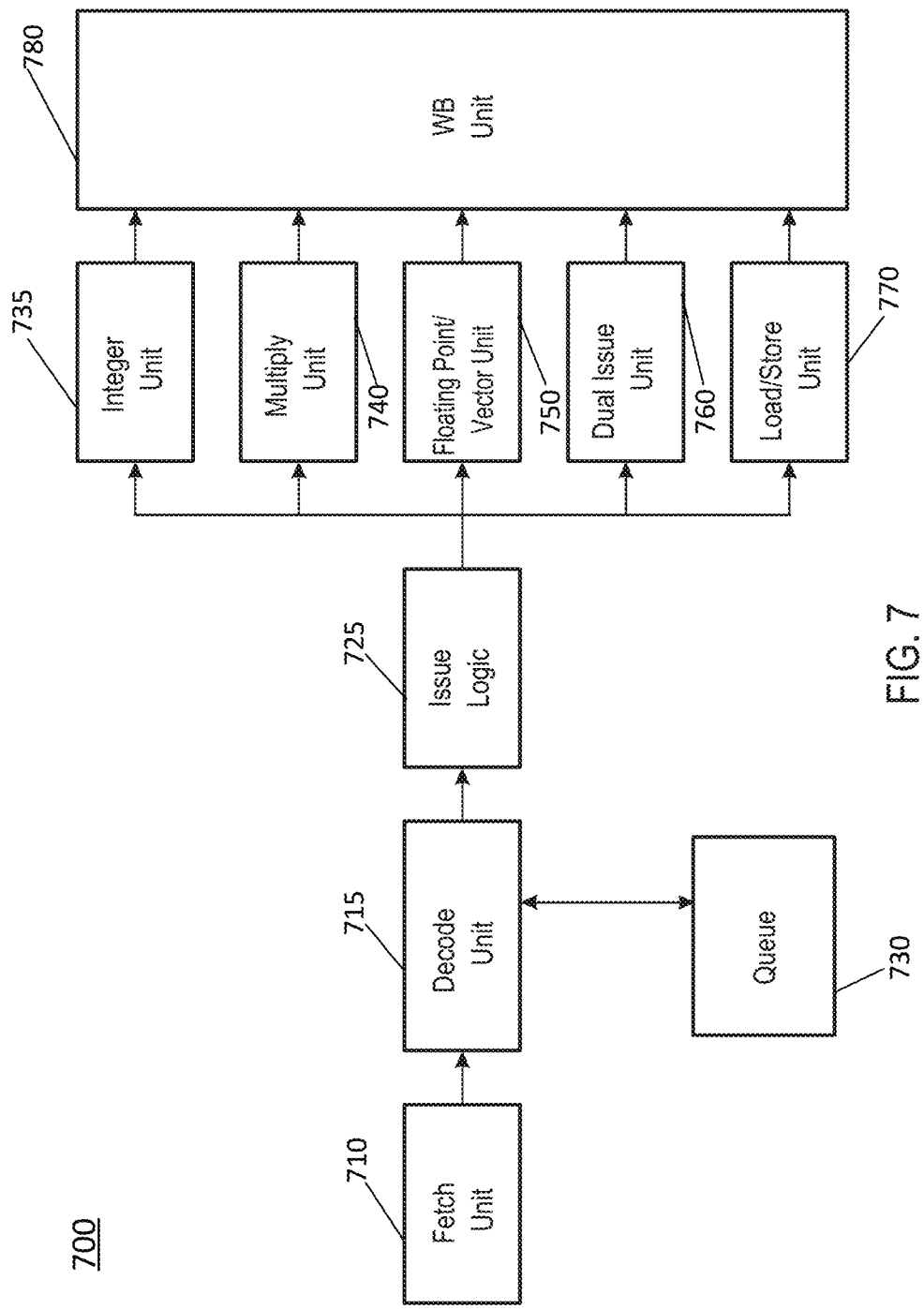
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
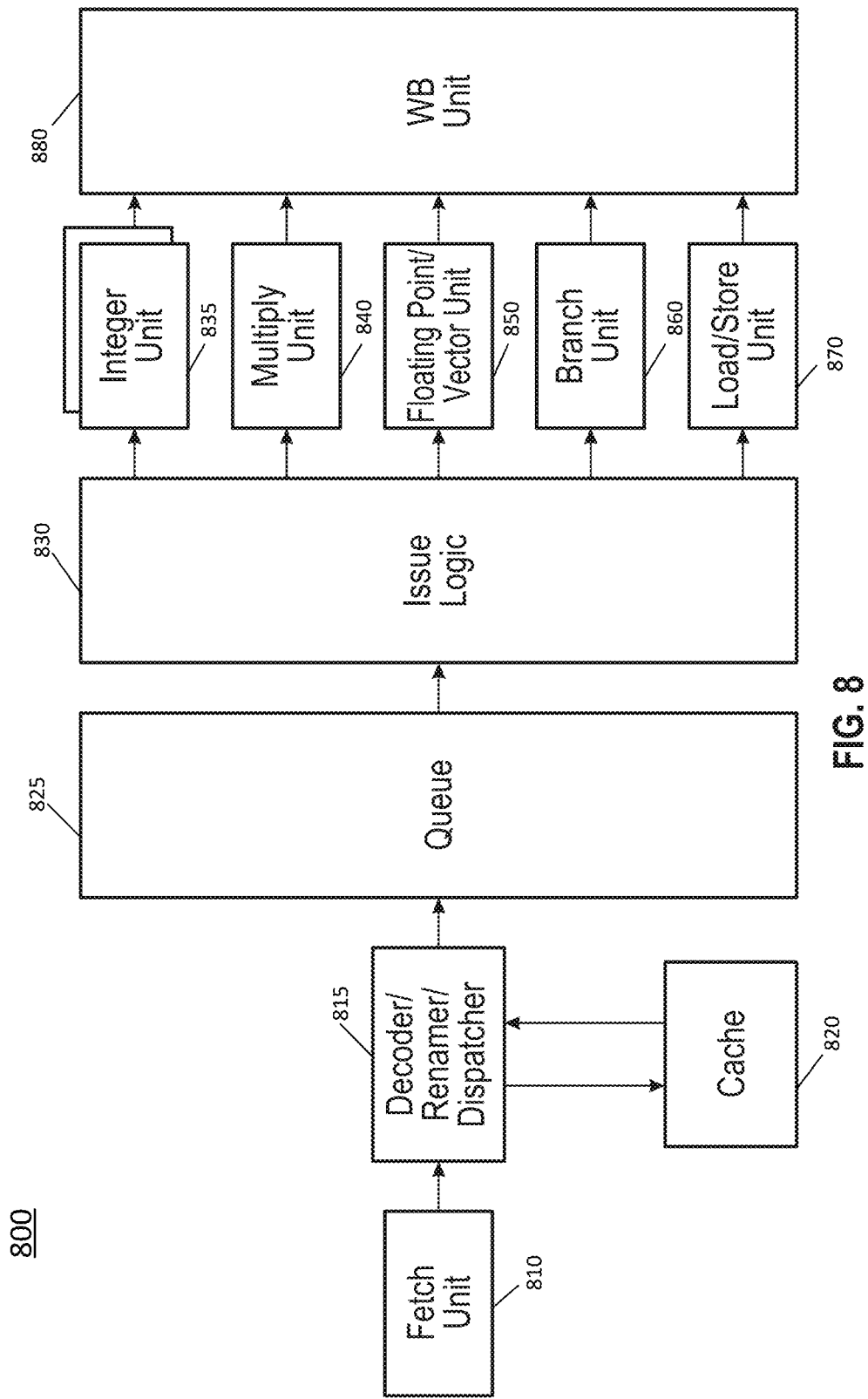
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples. Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
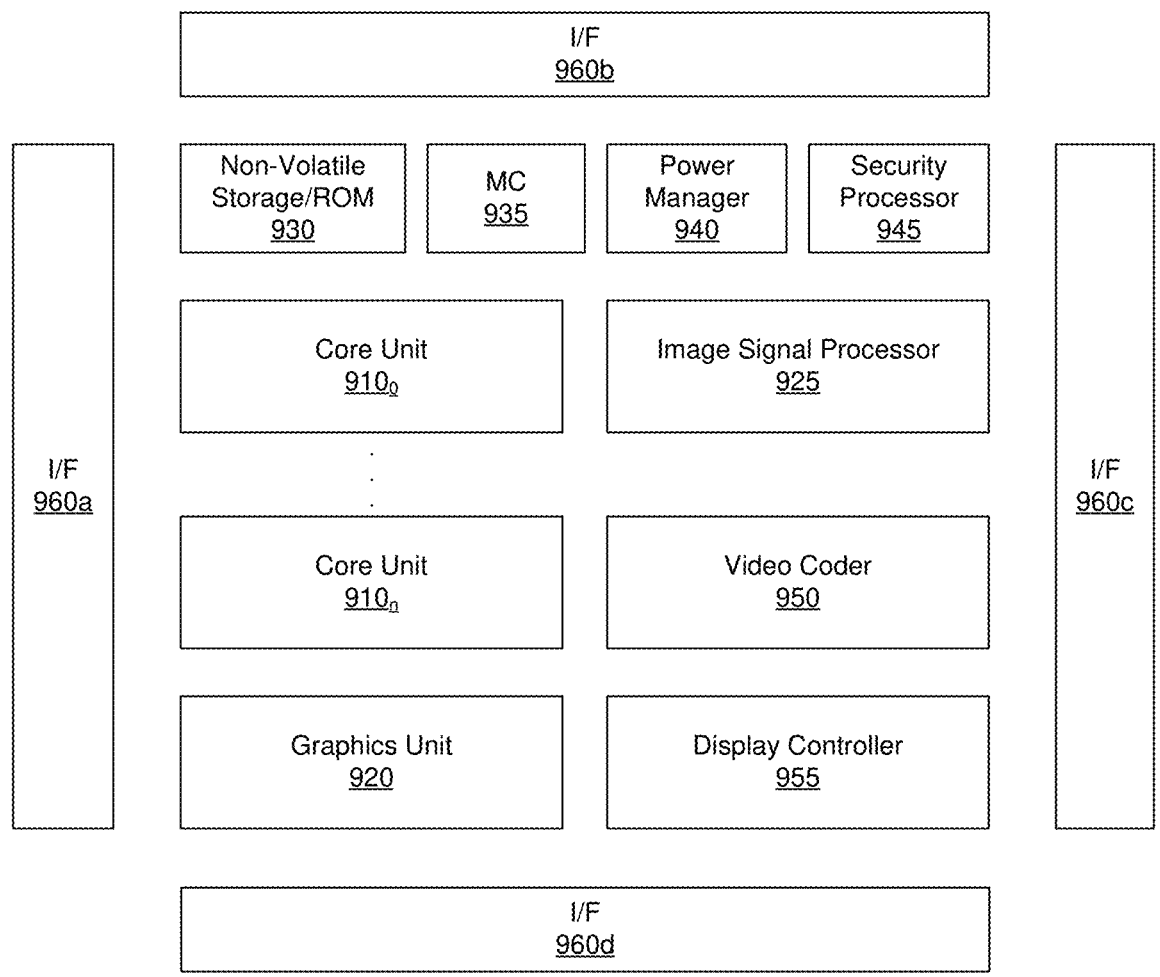
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device or connected device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
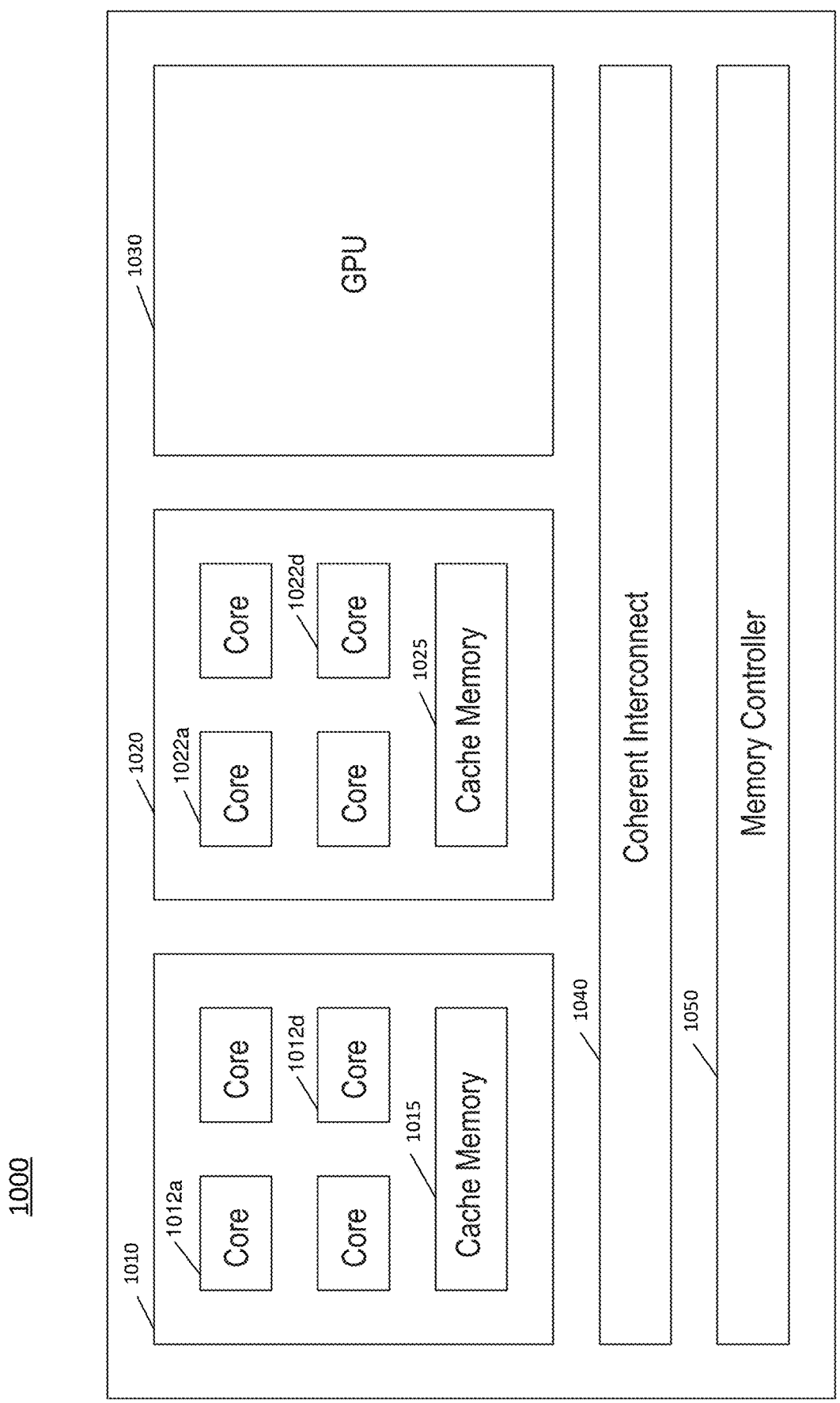
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel® and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
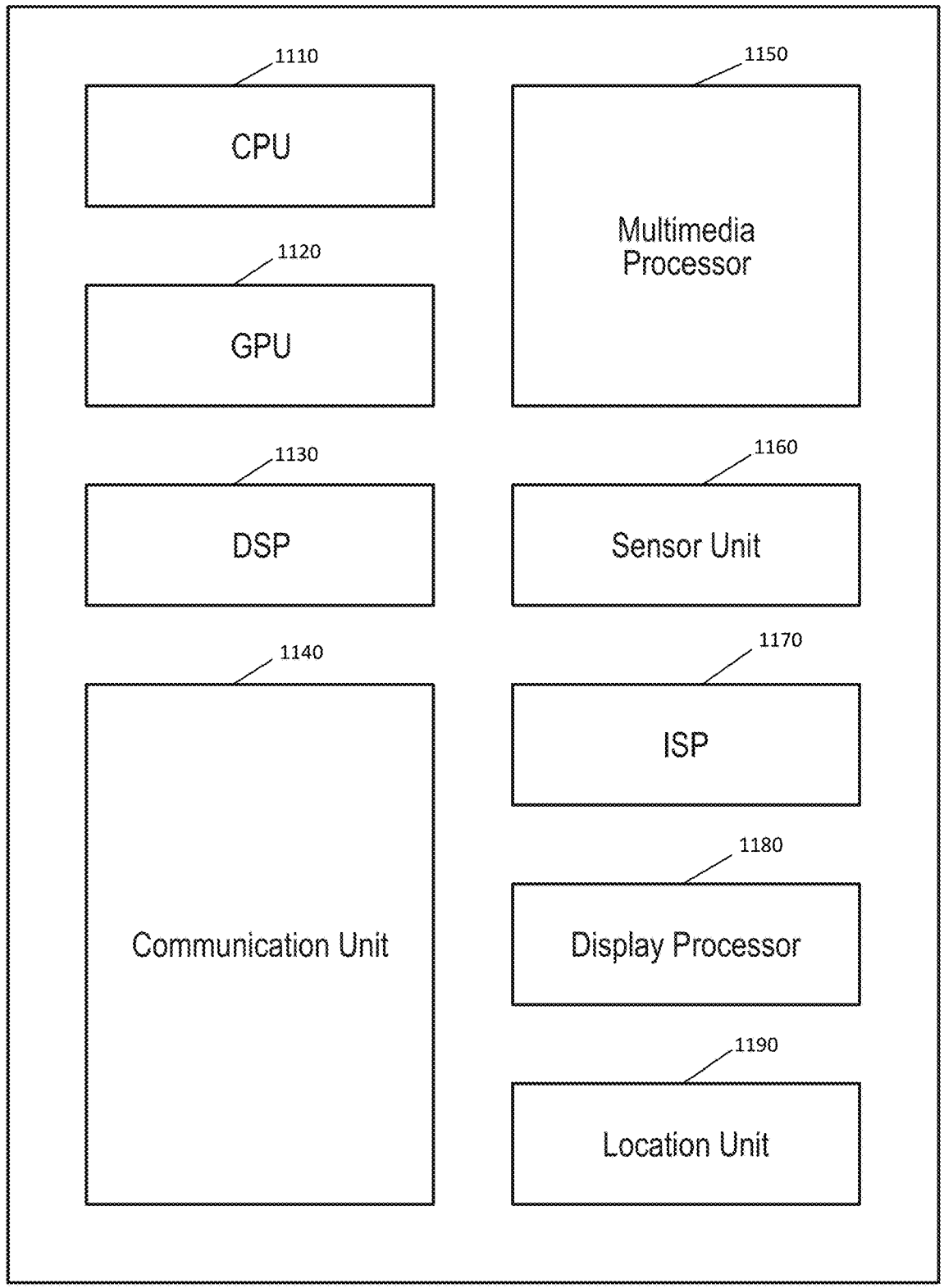
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
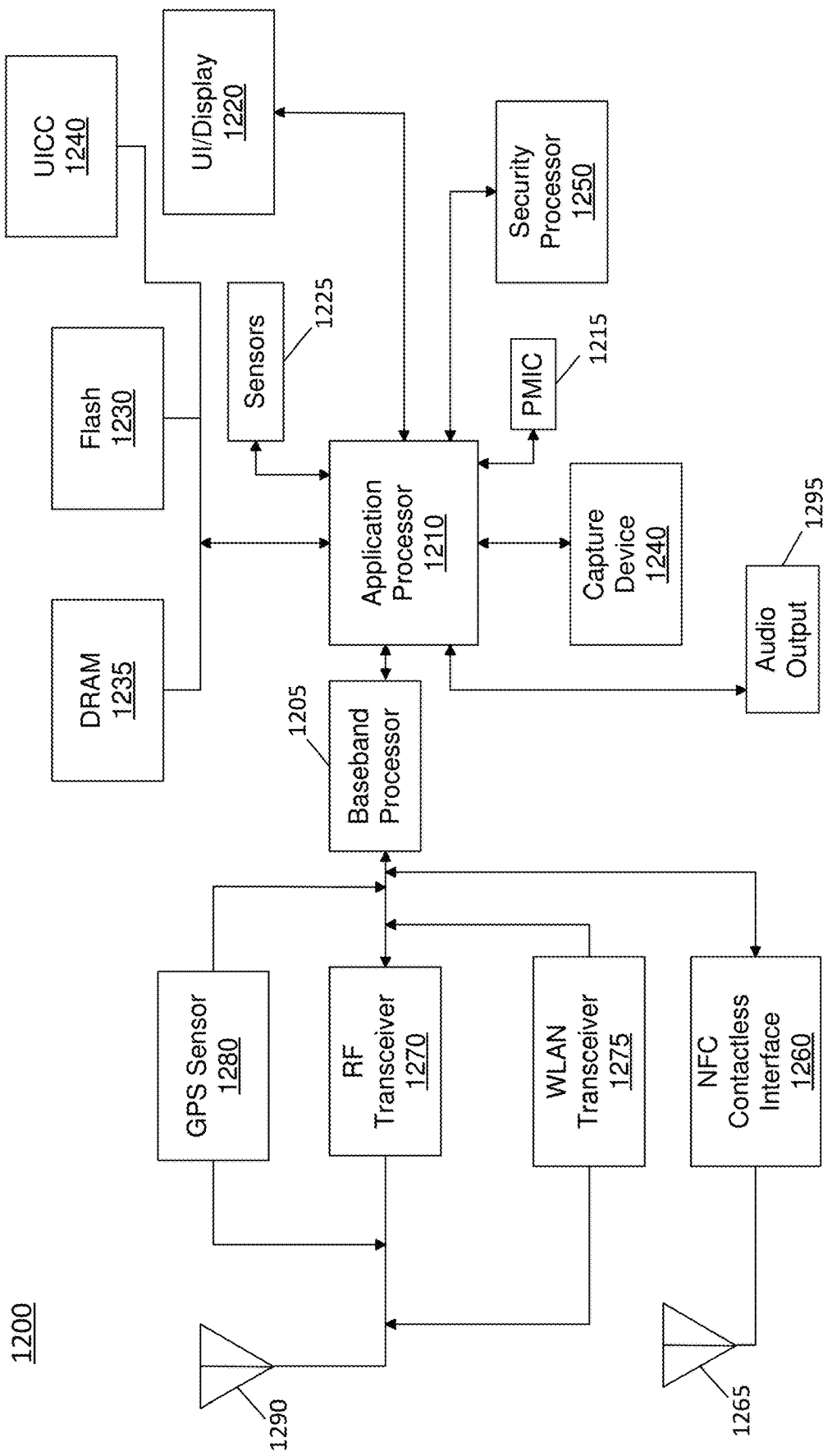
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device and perform the power management techniques described herein.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A PMIC 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present.

Other wireless communications such as receipt or transmission of radio signals, e.g., AM/FM and other signals may also be provided. In addition, via WLAN transceiver 1275, local wireless communications can also be realized.

Figure 13:
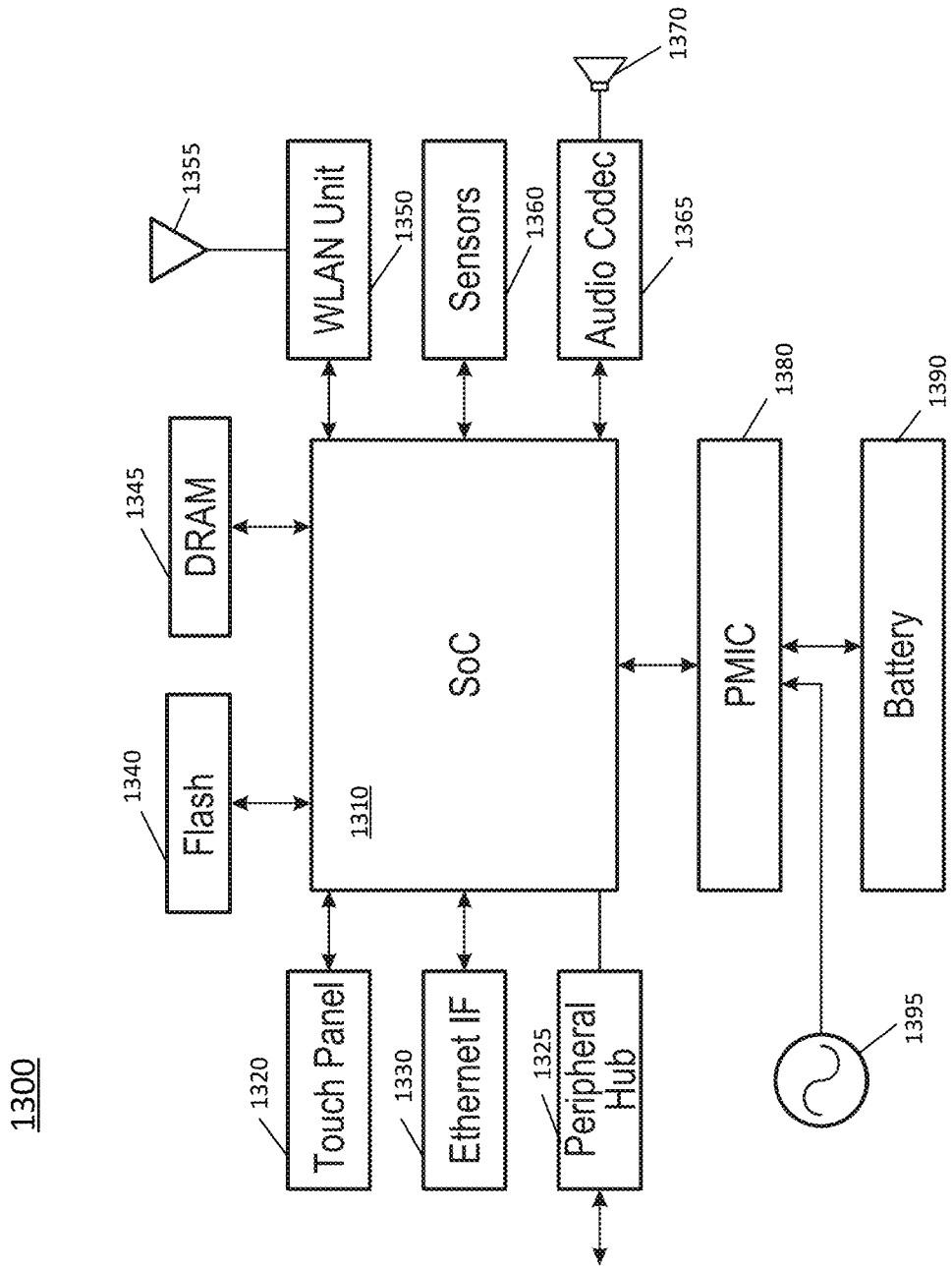
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device and perform the power management techniques described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
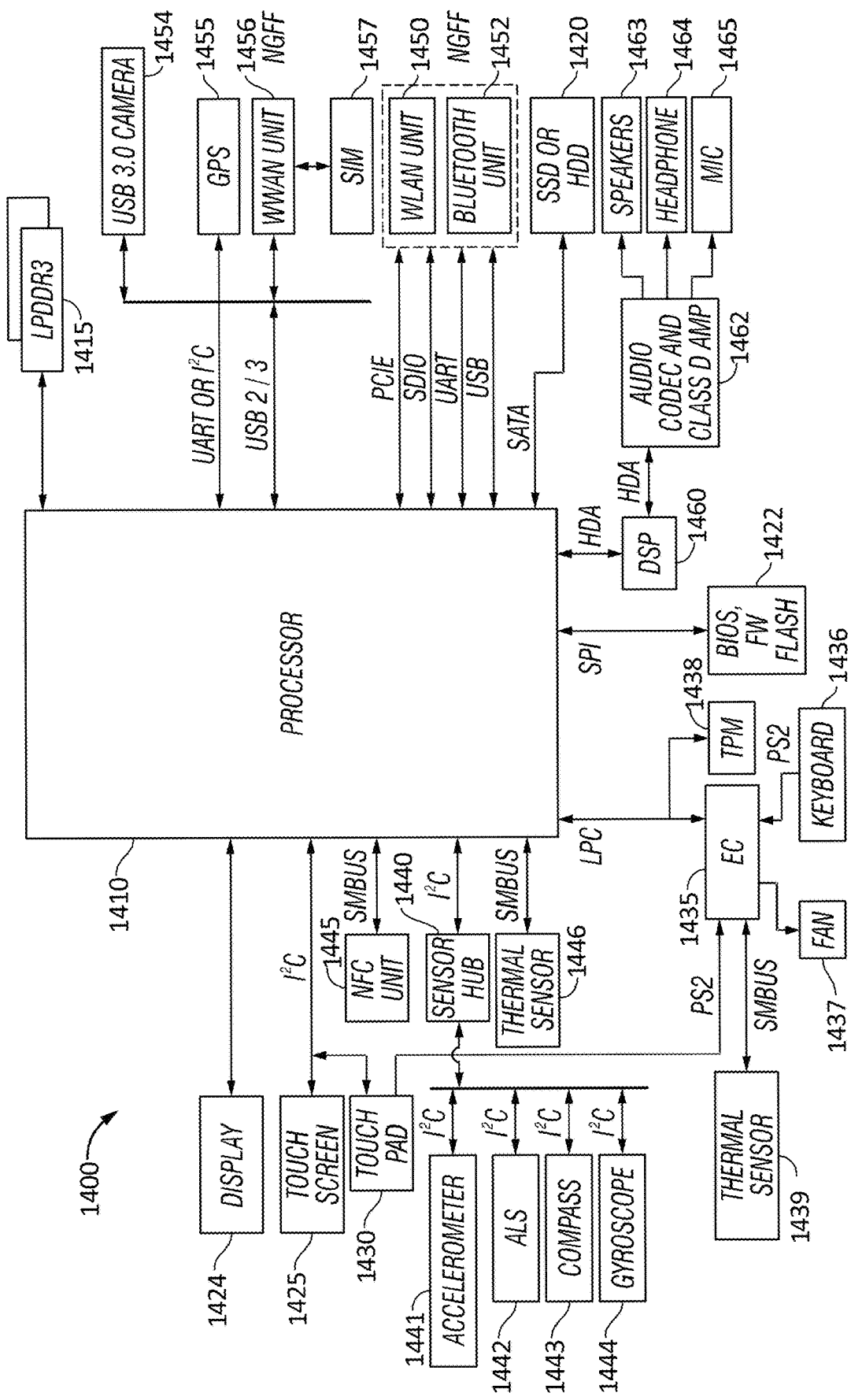
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I²C interconnect. As further shown in FIG. 14, in addition to touch screen 1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an $I_{2C}$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
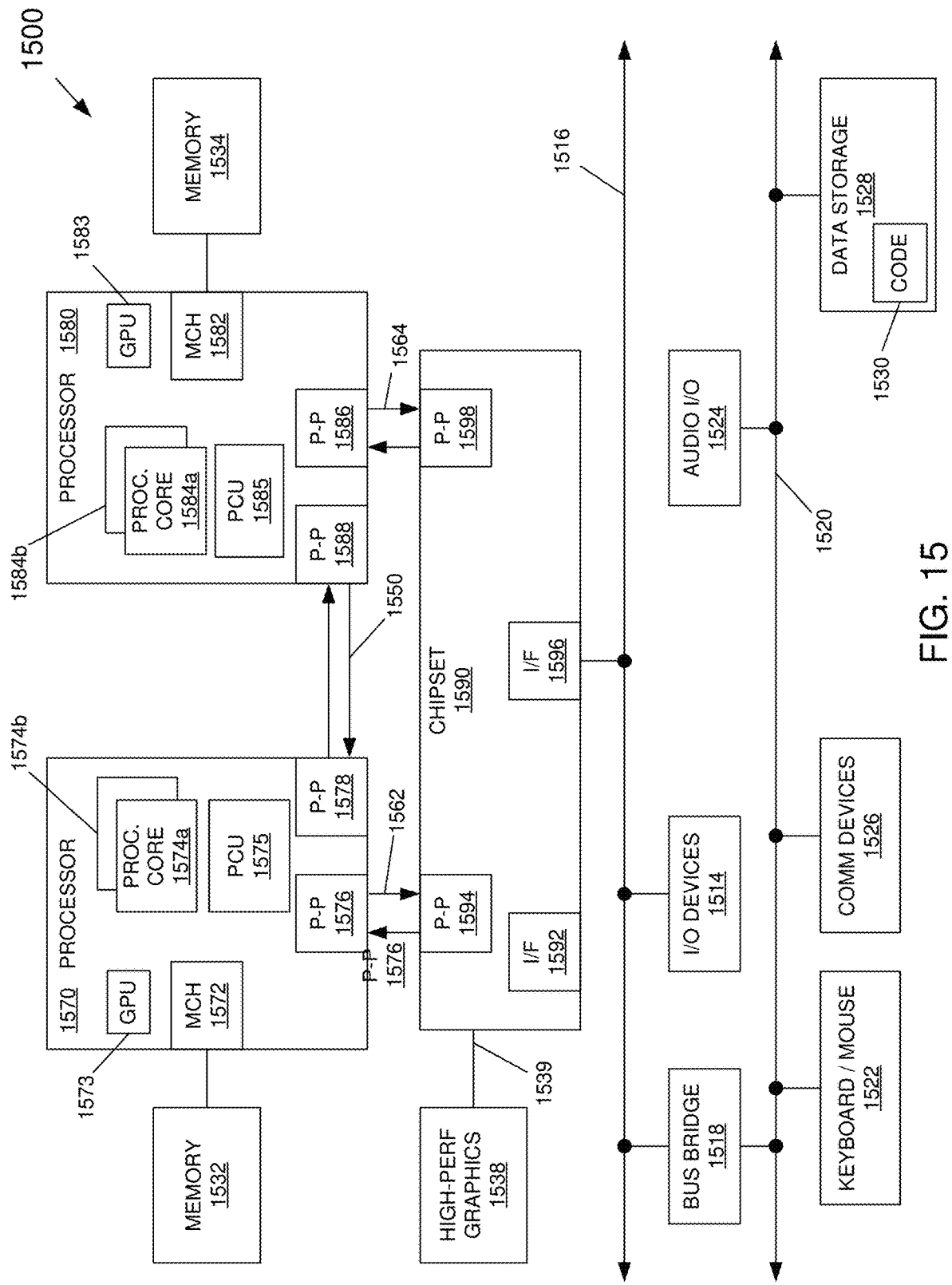
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processors 1574a and 1574b and processor cores 1584a and 1584b), although potentially many more cores may be present in the processors. In addition, each of processors 1570 and 1580 also may include a graphics processor unit (GPU) 1573, 1583 to perform graphics operations. Each of the processors can include a PCU 1575, 1585 to perform processor-based power management, including low power control circuitry to may trigger low power state entries and exits. In turn, port circuitry that interfaces with a save restore memory may enable faster low power state entry and exit, by causing updates to corresponding CSRs to be saved into the save restore memory concurrently with the updates to the CSRs themselves, as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
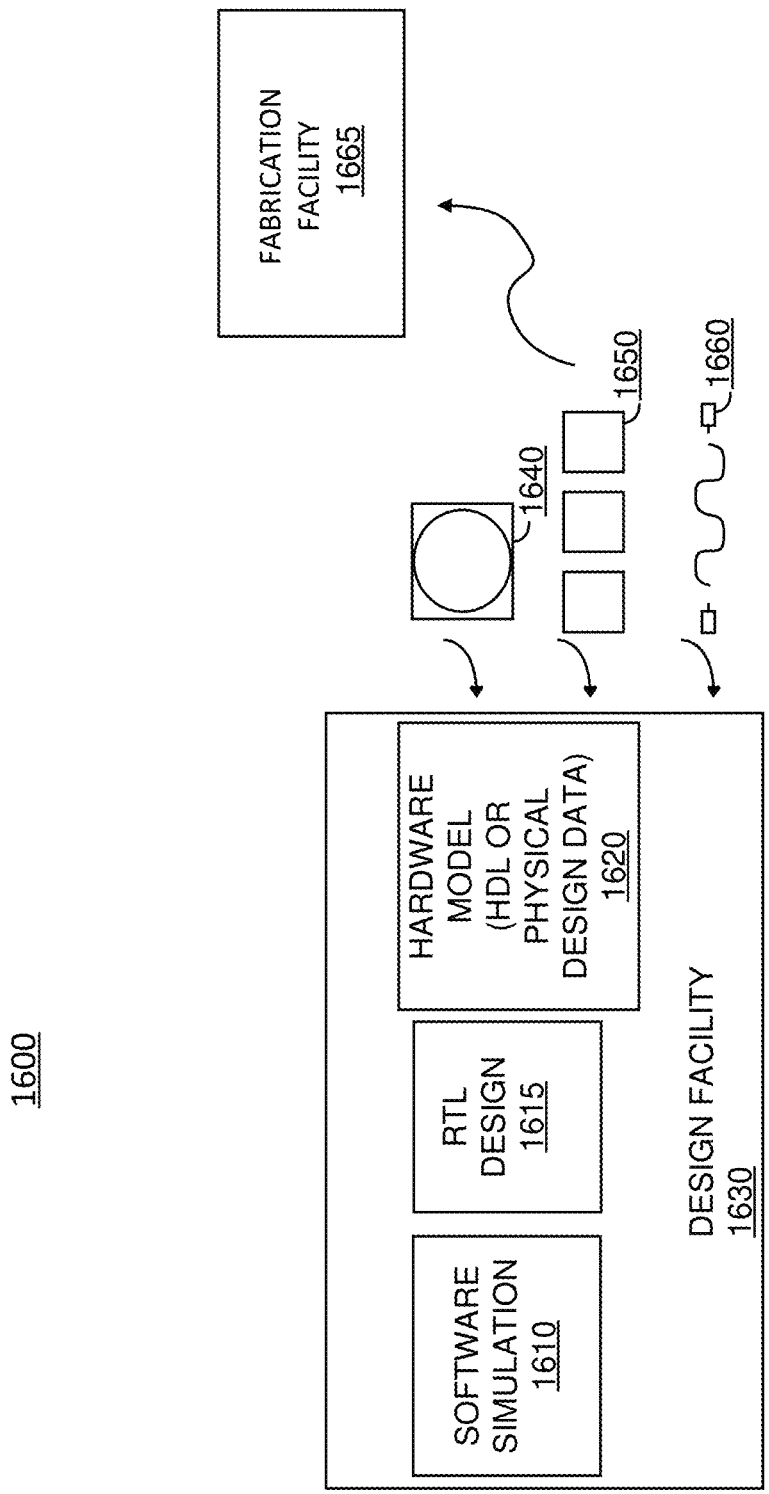
FIG. 16 is a block diagram illustrating an IP core development system used to manufacture an integrated circuit to perform operations according to an embodiment.

FIG. 16 is a block diagram illustrating an IP core development system 1600 that may be used to manufacture an integrated circuit to perform operations according to an embodiment. The IP core development system 1600 may be used to generate modular, re-usable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

Figure 17:
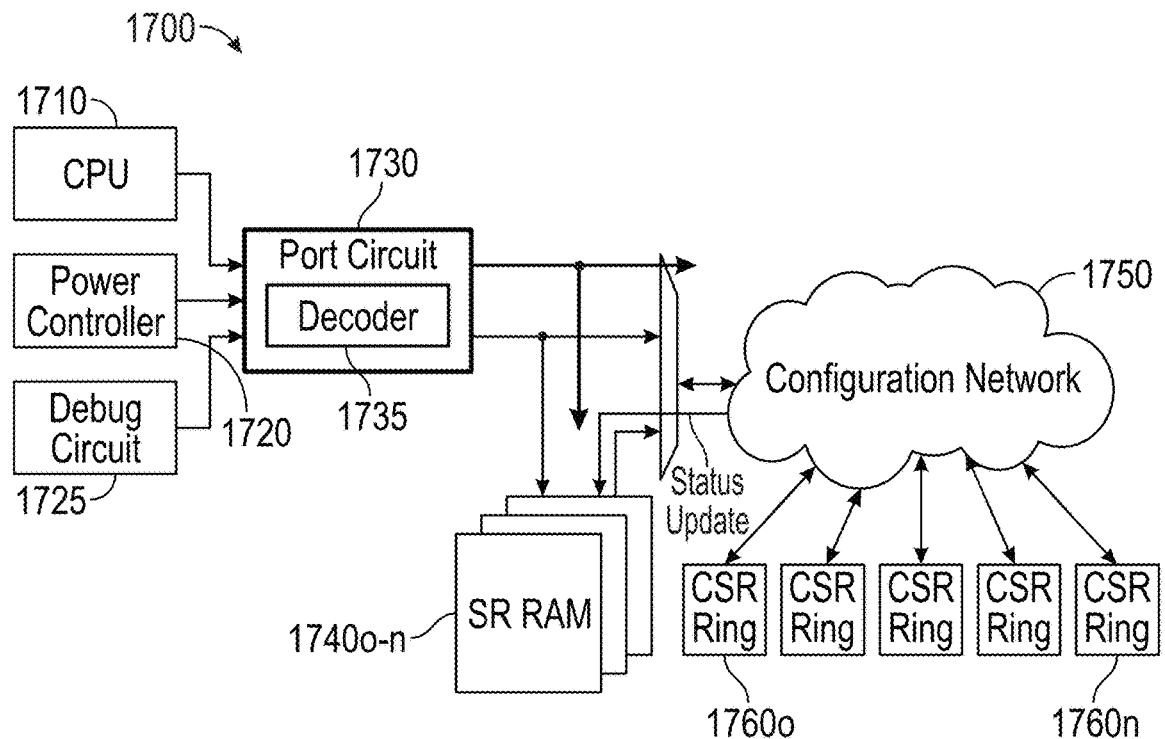
FIG. 17 is a block diagram of part of an IP/system on chip in accordance with an embodiment.

Referring now to FIG. 17, shown is a block diagram of an IP/SoC in accordance with an embodiment. Only a portion of an IP/SoC 1700 is illustrated to describe components involved in the dynamic save restore memory updating. Note that while described as an IP/SoC, in other cases the device may be an edge inference processor, NoC, IP or other type of integrated circuit. As illustrated, SoC 1700 includes a central processing unit (CPU) 1710, a power controller 1720 such as a power management unit (PMU) or other power management controller, and a debug circuit 1725. Each of these components may, during normal operation, seek to write configuration information into CSRs that may be associated with various logic of the SoC. This logic is generally referred to herein as IP circuits, each of which includes one or more CSRs that leverage the dynamic save restore memory operations described herein. While these IP circuits are not shown in detail in FIG. 17, understand that various IP circuits such as processing units, graphics processing units, accelerators, fixed function units, controllers, and so forth may have one or more CSRs associated therewith. Note these IP circuits including one or more CSRs and which leverage embodiments also may be referred to herein as "nodes." These CSRs may be accessed via an interconnect hierarchy including a configuration network 1750 that is in communication with a plurality of CSR ring interfaces 1760$_0$-1760$_n$. Each ring interface 1760 may be coupled to one or more nodes each including one or more CSRs.

As seen, CPU 1710, power controller 1720 and debug circuit 1725 couple to a port circuit 1730. In embodiments herein, port circuit 1730 may be a single aggregator port such as a register bus master to funnel accesses from all sources to all CSRs.

As illustrated, port circuit 1730 includes a decoder 1735. In embodiments, decoder 1735 may be configured to decode incoming configuration writes to determine a destination for these writes. These configuration writes may be received from various sources, as shown in FIG. 17; more generally such write requests may be received from software, microcode, power management code and so forth. In addition to sending these configuration writes along to the corresponding destination CSRs via configuration network 1750, decoder 1735 and port circuit 1730 also may be configured to update corresponding entries in a save restore memory in parallel, concurrently with the write operations to the destinations. Note that decoder 1735 may also be configured to decode CSR reads, and cause most of these CSR reads to be could be served from the save restore memory itself after the CSRs are modified, as discussed further below.

In FIG. 17, the save restore memory is implemented as SR RAM 1740, formed of multiple banks 1740$_0$-1740$_n$. In one or more embodiments, SR RAM 1740 may be implemented as an on-chip static RAM (SRAM). This SRAM may be provided with a retention voltage when some or all of SoC 1700 is in a low power state, to enable maintenance of the save restore information in SR RAM 1740. In an embodiment, to reduce power consumption in banks 1740, they may remain in a powered down state until a first CSR write access comes to a node. Subsequently after this first access, the banks may remain in a clock-gated state until a next access to CSR requiring respective RAM bank access occurs.

With an embodiment as in FIG. 17, SR RAM 1740 is dynamically maintained up to date with configuration information as and when such configuration information is updated into destination CSRs. To reduce the size of the SR RAM 1740, CSR addresses may be grouped into addresses for CSRs requiring save/restore and addresses for CSRs not requiring save/restore, as described further below. In such cases, SR RAM 1740 tracks only the save/restore address group. Also SR RAM banks could be grouped per power domain to enable low power operation of the SR RAM banks.

Various nodes (including associated IP circuits having the CSRs) may dynamically update SR RAM 1740 as and when status updates are written to the CSRs. Understand while shown at this high level in the embodiment of FIG. 17, many variations and alternatives are possible. For example, in addition to the illustrated sources of configuration writes, additional circuitry such as accelerators or so forth also may provide configuration updates.

Figure 18:
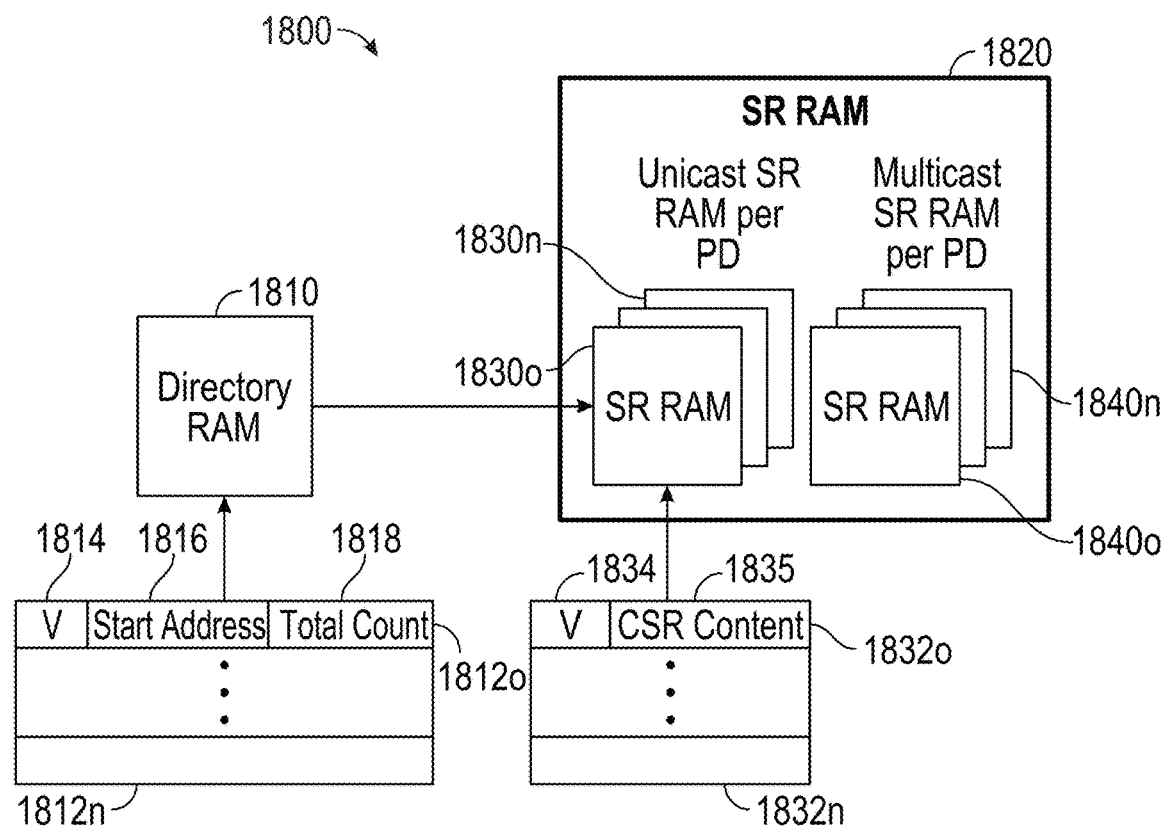
FIG. 18 is a block diagram of a save restore memory in accordance with an embodiment.

Referring now to FIG. 18, shown is a block diagram of a save restore memory in accordance with an embodiment. As shown in FIG. 18, memory 1800 may be implemented as a SR RAM (e.g., corresponding to SR RAM 1740 of FIG. 17). In the high level shown in FIG. 18, memory 1800 is separated into a directory RAM 1810 and a SR RAM 1820 including multiple banks, namely first banks 1830$_{0-m}$ which may be used for unicast save restore information, e.g., on a per power domain basis. In addition, second banks 1840$_{0-m}$ which may be used for multicast save restore information, e.g., on a per power domain basis. Also understand that there may be different portions of SR RAM 1820 for status information and configuration information, in one or more embodiments.

Still with reference to FIG. 18, directory RAM 1810 may be configured to store start address information, namely a starting address within SR RAM 1820 at which one or more entries associated with a given node ID may be stored. Directory RAM 1810 may include a plurality of directory entries 1812$_0$-1812$_n$. in one or more embodiments, the number of entries 1812 may equal the number of nodes in an SoC. As illustrated, each directory entry includes a plurality of fields, namely a valid field 1814, which may store a valid bit, a start address field 1816, which may store a start address for a node, and a count field 1818, which may store a total count of the number of entries within SR RAM 1820 associated with the given node (and which may be restored after a low power state exit). In an embodiment, the total count may be equal to: node n+1 start address−node n (current node) start address. In an embodiment, the start address portion of directory RAM 181—may be read only memory (ROM)—configured at the time of design.

The CSR start address provides a pointer to the SR RAM where the CSRs are stored for a particular node ID. Directory RAM 1810 may be addressed using the node ID extracted from a CSR offset address. When a CSR write is decoded, first the directory SR RAM entry pointed by the node ID is read to get the location of CSR start address in SR RAM 1820. The CSR that is being accessed is updated in SR RAM 1820 with the address calculated as: start address read from the directory RAM+CSR offset address from the CSR write transaction.

As further shown, each bank of SR RAM 1830 (and 1840) may include a plurality of entries 1832$_0$-1832$_n$. Each such entry 1832 may include a valid field 1834 to store a valid bit and a content field 1836 to store CSR content information.

To compress the SR RAM size requirements, all CSRs may be grouped into two address ranges: a first address range (A to B) for CSRs that are saved/restored for low power modes; and a second address range (B to C) for CSRs that are not required for save/restore. In this way, the SR RAM banks can be sized only for the CSR address ranges A to B, and thus CSR writes within address range A to B are copied into the SR RAM banks.

Embodiments of a SR RAM may also provide support for a variable number of CSRs per node. A node ID may be encoded in upper address bits of CSR transaction address bits. To support a variable number of CSRs per node and compress the SR RAM size, the SR RAM can be organized as described herein and shown in FIG. 18. Understand while shown at this high level in the embodiment of FIG. 18, many variations and alternatives are possible. For example, embodiments may be implemented on a single configuration port entering into an IP circuit. Alternately a central system configuration agent aggregating multiple request sources and driving configuration accesses to all IP circuits may implement an embodiment. In some embodiments, the valid bits of the SR RAM could be implemented as a physically separate entity to read multiple entries in advance and decide what entries from the SR RAM are to be read and restored back to CSRs.

Figure 19:
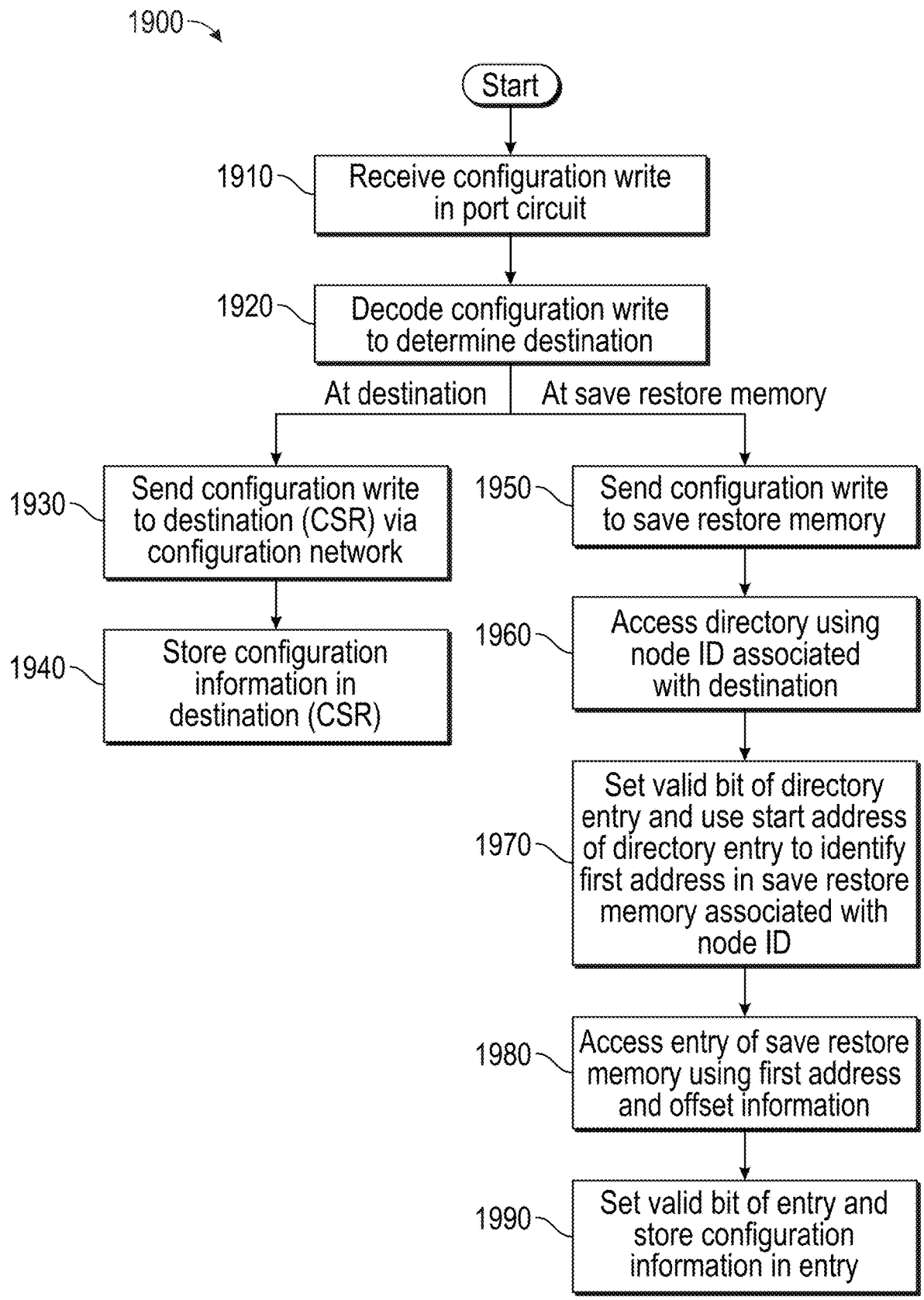
FIG. 19 is a flow diagram of a save method in accordance with an embodiment.

Referring now to FIG. 19, shown is a flow diagram of a method in accordance with an embodiment. More specifically as shown in FIG. 19, method 1900 is a method for dynamically updating a save restore memory in accordance with an embodiment. As such, method 1900 may be performed by hardware circuitry such as a port circuit, along with circuitry associated with the save restore memory and one or more nodes having CSRs that are to be updated. As illustrated, method 1900 begins by receiving a configuration write in the port circuit (block 1910). This configuration write may be a write request from a given source circuit such as CPU, power manager or so forth to write configuration information into a given CSR. At block 1920 the configuration write may be decoded to identify its destination (e.g., node and corresponding CSR within the node) so that it may be directed appropriately via a configuration network.

Still with reference to FIG. 19, operations may occur in parallel to write the configuration information concurrently to both the destination CSR and the save restore memory. Following the left side, which represents operation at the destination, the configuration write is sent to this destination via the configuration network (block 1930). Then at block 1940, the configuration information may be stored into the destination CSR. Note a valid bit of the CSR may be set.

Referring to the right side, various operations may occur to also write the configuration information into the save restore memory. At block 1950, the configuration write is sent to the save restore memory. Then at block 1960, a directory may be accessed using a node ID associated with the destination. At block 1970, a valid bit of the directory entry for this node ID may be set, and a start address may be obtained and used to identify a first address in the save restore memory that is associated with the node ID.

Next at block 1980, using this first address and offset information, a given entry within the save restore memory may be accessed. Accordingly at block 1990, that entry is written with the configuration information and the valid bit for that entry is set. As such, updates to the save restore memory occur as and when updates occur to the CSRs themselves. Understand while shown at this high level in the embodiment of FIG. 19, many variations and alternatives are possible. For example while the above discussion regards configuration write information, a similar path (as illustrated on the right side) may occur for status updates that are received in the port circuit from the logic circuits themselves when CSRs are updated with new status.

Figure 20:
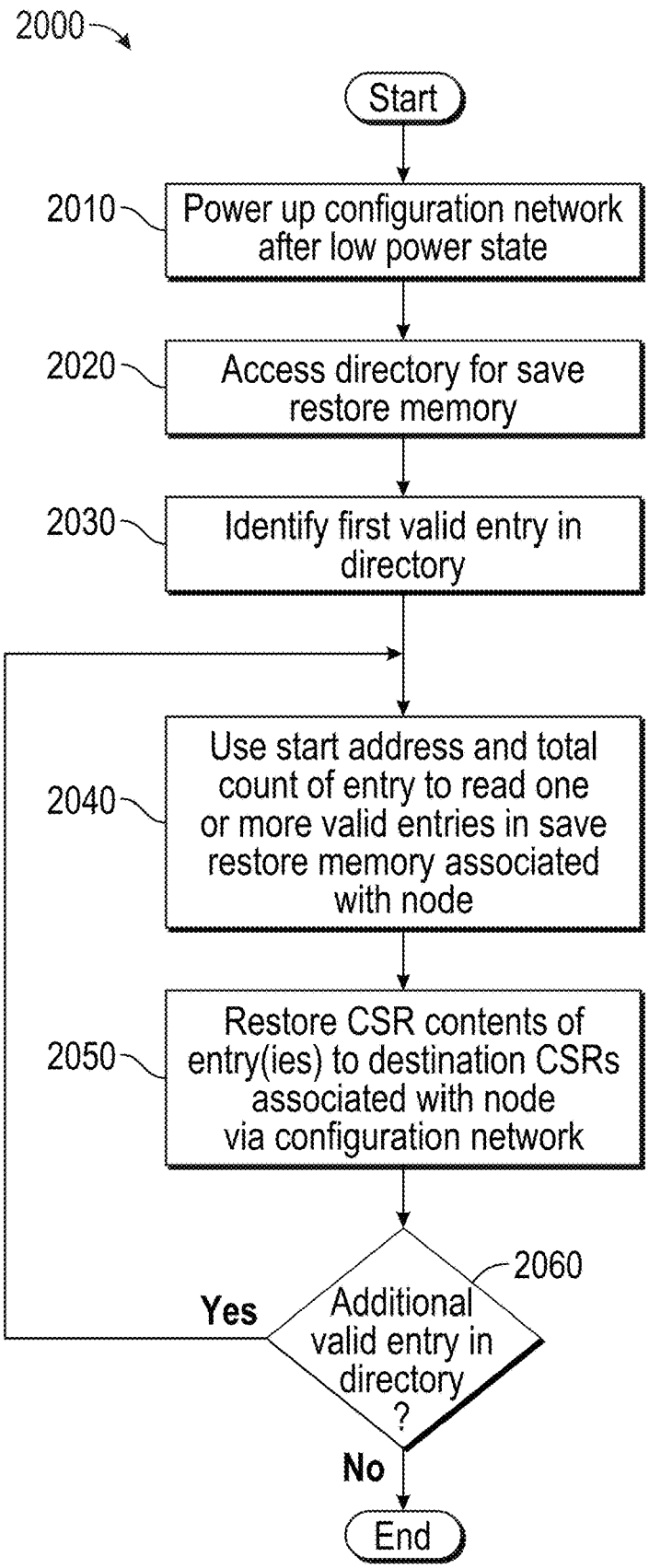
FIG. 20 is a flow diagram of a restore method in accordance with another embodiment.

Referring now to FIG. 20, shown is a flow diagram of a method in accordance with another embodiment. As illustrated, method 2000 is a method for restoring information from a save restore memory in accordance with an embodiment. As such, method 2000 may be performed by hardware circuitry such as a power controller, in combination with a port circuit and circuitry associated with the save restore memory and one or more nodes having CSRs.

Method 2000 begins at block 2010, where the configuration network may be powered up after exit from a low power state. Control next passes to block 2020 where the directory of the save restore memory may be accessed. At block 2030, a first valid entry within this directory may be identified. In this way, a reduced latency low power state exit may be realized since one or more sets of nodes that do not have update information in the save restore memory can avoid the restore. That is, if the valid bit for a directory entry for a node is not set, then CSR restore operation for the entire node is skipped. During CSR restore operation triggered by a power management controller, a finite state machine (FSM) may walk over each directory entry in the directory RAM. To reduce the restore time further, the valid bits of the SR RAM could be implemented as physically separate entity to read multiple entries in advance and decide what entries from the SR RAM are to be read and restored back to CSRs.

Still with reference to FIG. 20, at block 2040, the start address and total count of the valid directory entry may be used to read one or more valid entries within the save restore memory that are associated with the node. Thus when the first directory entry with a valid bit set is detected in the directory RAM, it provides the CSR start address to the SR RAM along with the maximum number of CSRs to be read from the SR RAM. Note that SR RAM bank entries for this given node that are not valid are skipped and not restored. Next, at block 2050, the CSR contents of such entries may be restored to the destination CSRs that are associated with this node via the configuration network. With reference back to the directory, it may be determined whether there is another directory entry with a bit set valid bit at diamond 2060. If so, control passes back to block 2040. Otherwise method 2000 concludes.

With embodiments, close to zero CSR save time may be incurred during low power mode entry. Thus faster lower power mode entry may provide a greater number of opportunities for low power mode entries, depending on use case. Embodiments may be particularly suited for very low power devices/use cases requiring frequent wake up to perform tasks and going back to sleep quickly. Faster CSR restore time may be realized since only modified CSRs are restored, resulting in low latency observed by applications post wake up from a deep low power mode. Power consumption also may be reduced as there may be lower energy consumed in register save/restore operations because a configuration network is powered for a shorter duration after a low power mode entry/exit decision is made.

The following examples pertain to further embodiments.

In one example, an apparatus comprises: a port circuit to receive a configuration write from a source circuit; a save restore memory coupled to the port circuit to store information of a plurality of CSRs; and a configuration network coupled to the port circuit, the configuration network coupled to a plurality of nodes, each of the plurality of nodes comprising at least one CSR, where the port circuit is to send the configuration write to a first node of the plurality of nodes and to the save restore memory.

In an example, the port circuit is to concurrently send the configuration write to the first node and to the save restore memory.

In an example, the port circuit comprises a decoder to receive the configuration write and identify the first node based at least in part on an address associated with the configuration write, wherein the decode circuit is configured to send configuration information of the configuration write to the save restore memory.

In an example, the save restore memory comprises a directory, the directory comprising a plurality of directory entries, each of the plurality of directory entries having a valid field to store a valid bit to indicate that at least one entry in the save restore memory associated with a node has been updated.

In an example, each of the plurality of directory entries further comprises: an address field to store a start address within the save restore memory at which entries of the node begin; and a count field to store a number of entries of the save restore memory associated with the node.

In an example, the apparatus is to skip restore for one or more nodes having an invalid bit present in the valid field of a corresponding directory entry of the directory.

In an example, the apparatus is to restore only valid entries of the save restore memory to corresponding CSRs.

In an example, when the configuration network is powered down, the apparatus is to read status information of a first CSR from the save restore memory while a node comprising the first CSR remains powered down.

In an example, the apparatus is to read first configuration information of a first entry of the save restore memory and send the first configuration information to a first set of CSRs.

In an example, the first node is to send a status update to a second CSR included in the first node to the port circuit concurrently with the status update to the second CSR, and the port circuit is to send the status update to the save restore memory for storage.

In another example, a method comprises: receiving, in a port circuit of the processor coupled to a configuration network, a configuration write; decoding the configuration write to determine a destination of the configuration write; and sending the configuration write concurrently to a save restore memory and to the destination.

In an example, the method further comprises: accessing a directory for the save restore memory using an identifier associated with the destination; and setting a valid indicator of a directory entry of the directory associated with the node identifier to indicate an update to the save restore memory for the destination.

In an example, the method further comprises storing configuration information of the configuration write in a storage location of the save restore memory associated with the destination, using a start address obtained from the directory entry.

In an example, the method further comprises: in response to a status update to a CSR, receiving the status update in the port circuit; and sending the status update to the save restore memory for storage in a storage location of the save restore memory associated with the CSR.

In an example, the method further comprises: receiving, in the port circuit, a status read request for the CSR; when the configuration network is in a low power state, reading status information present in the storage location of the save restore memory; and providing the status information to a requester, while the configuration network remains powered down.

In an example, the method further comprises: powering up the configuration network after a low power state; accessing a directory for the save restore memory to identify a first valid entry in the directory; using a start address and count information of the first valid entry to read one or more valid entries in the save restore memory; and restoring information from the one or more valid entries to destination CSRs via the configuration network, and not restoring information from one or more invalid entries in the save restore memory.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system comprises: a processor comprising: a CPU; a power controller to control power consumption of the processor; a plurality of IP circuits, each of the IP circuits comprising at least one CSR; a port circuit coupled to the CPU, the power controller and the plurality of IP circuits, the port circuit to receive a configuration write from at least one of the CPU or the power controller; a SRAM coupled to the port circuit to store information of a plurality of CSRs, where the SRAM is to be provided with a retention voltage in a low power state; and a configuration network to couple the port circuit to the plurality of IP circuits, wherein the port circuit is to send the configuration write concurrently for storage in the SRAM and in a first IP circuit of the plurality of IP circuits; and a system memory coupled to the processor.

In an example, in response to a status update to a first CSR of the first IP circuit, the first IP circuit is to send status information of the status update to the port circuit via the configuration network for storage in the SRAM.

In an example, the port circuit, in response to a status read request from the CPU for the first CSR when the configuration network is in a low power state, is to obtain the status information from the SRAM and provide the status information to the CPU.

In an example, the processor comprises an edge inference processor.

In another example, an apparatus comprises: port means for receiving a configuration write to a CSR means; means for decoding the configuration write to determine a destination means of the configuration write; and means for sending the configuration write concurrently to a save restore memory means and to the destination means.

In an example, the apparatus further comprises: means for accessing a directory means using an identifier associated with the destination means; and means for setting a valid indicator of a directory entry of the directory means associated with the node identifier to indicate an update to the save restore memory means for the destination means.

In an example, the apparatus further comprises means for storing configuration information of the configuration write in a storage location of the save restore memory means associated with the destination, using a start address obtained from the directory entry.

In an example, the apparatus further comprises: means for receiving a status update to a CSR means; and means for sending the status update to the save restore memory means for storage in a storage location of the save restore memory means associated with the CSR means.

In an example, the apparatus further comprises: means for receiving a status read request for the CSR means when a configuration network means is in a low power state; means for reading status information present in the storage location of the save restore memory means; and means for providing the status information to a requester, while the configuration network means remains powered down.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
a port circuit to receive a configuration write from a source circuit;
a save restore memory coupled to the port circuit to store information of a plurality of control and status registers (CSRs); and
a configuration network coupled to the port circuit, the configuration network coupled to a plurality of nodes, each of the plurality of nodes comprising at least one CSR, wherein the port circuit is to send the configuration write to a first node of the plurality of nodes and to the save restore memory.

2. The apparatus of claim 1, wherein the port circuit is to concurrently send the configuration write to the first node and to the save restore memory.

3. The apparatus of claim 1, wherein the port circuit comprises a decoder to receive the configuration write and identify the first node based at least in part on an address associated with the configuration write, wherein the decoder is configured to send configuration information of the configuration write to the save restore memory.

4. The apparatus of claim 1, wherein the save restore memory is to store a directory, the directory comprising a plurality of directory entries, each of the plurality of directory entries comprising a valid field to store a valid bit to indicate that at least one entry in the save restore memory associated with a node has been updated.

5. The apparatus of claim 4, wherein each of the plurality of directory entries further comprises:
an address field to store a start address within the save restore memory at which entries of the node begin; and
a count field to store a number of entries of the save restore memory associated with the node.

6. The apparatus of claim 4, wherein the apparatus is to skip restore for one or more nodes having an invalid bit present in the valid field of a corresponding directory entry of the directory.

7. The apparatus of claim 1, wherein the apparatus is to restore only valid entries of the save restore memory to corresponding CSRs.

8. The apparatus of claim 1, wherein when the configuration network is powered down, the apparatus is to read status information of a first CSR from the save restore memory while a node comprising the first CSR remains powered down.

9. The apparatus of claim 1, wherein the apparatus is to read first configuration information of a first entry of the save restore memory and send the first configuration information to a first set of CSRs.

10. The apparatus of claim 1, wherein the first node is to send a status update to a second CSR included in the first node to the port circuit concurrently with the status update to the second CSR, and the port circuit is to send the status update to the save restore memory for storage.

11. A non-transitory computer readable medium comprising instructions that, when executed, cause a processor to perform a method comprising:
receiving, in a port circuit of the processor coupled to a configuration network, a configuration write;
decoding the configuration write to determine a destination of the configuration write; and
sending the configuration write concurrently to a save restore memory and to the destination.

12. The non-transitory computer readable medium of claim 11, wherein the method further comprises:
accessing a directory for the save restore memory using an identifier associated with the destination; and
setting a valid indicator of a directory entry of the directory associated with the identifier to indicate an update to the save restore memory for the destination.

13. The non-transitory computer readable medium of claim 12, wherein the method further comprises storing configuration information of the configuration write in a storage location of the save restore memory associated with the destination, using a start address obtained from the directory entry.

14. The non-transitory computer readable medium of claim 12, wherein the method further comprises:
in response to a status update to a configuration status register (CSR), receiving the status update in the port circuit; and
sending the status update to the save restore memory for storage in a storage location of the save restore memory associated with the CSR.

15. The non-transitory computer readable medium of claim 14, wherein the method further comprises:
receiving, in the port circuit, a status read request for the CSR;
when the configuration network is in a low power state, reading status information present in the storage location of the save restore memory; and
providing the status information to a requester, while the configuration network remains powered down.

16. The non-transitory computer readable medium of claim 11, wherein the method further comprises:
powering up the configuration network after a low power state;

accessing a directory for the save restore memory to identify a first valid entry in the directory;
using a start address and count information of the first valid entry to read one or more valid entries in the save restore memory; and
restoring information from the one or more valid entries to destination configuration and status registers (CSRs) via the configuration network, and not restoring information from one or more invalid entries in the save restore memory.

17. A system comprising:
a processor comprising:
  a central processing unit (CPU);
  a power controller to control power consumption of the processor;
  a plurality of intellectual property (IP) circuits, each of the IP circuits comprising at least one control and status register (CSR);
  a port circuit coupled to the CPU, the power controller and the plurality of IP circuits, the port circuit to receive a configuration write from at least one of the CPU or the power controller;
  a static random access memory (SRAM) coupled to the port circuit to store information of a plurality of CSRs, wherein the SRAM is to be provided with a retention voltage in a low power state; and
  a configuration network to couple the port circuit to the plurality of IP circuits, wherein the port circuit is to send the configuration write concurrently for storage in the SRAM and in a first IP circuit of the plurality of IP circuits; and
a system memory coupled to the processor.

18. The system of claim 17, wherein in response to a status update to a first CSR of the first IP circuit, the first IP circuit is to send status information of the status update to the port circuit via the configuration network for storage in the SRAM.

19. The system of claim 18, wherein the port circuit, in response to a status read request from the CPU for the first CSR when the configuration network is in a low power state, is to obtain the status information from the SRAM and provide the status information to the CPU.

20. The system of claim 17, wherein the processor comprises an edge inference processor.

* * * * *